United States Patent
Kimura et al.

[11] Patent Number: 6,076,172
[45] Date of Patent: Jun. 13, 2000

[54] MONITOTING SYSTEM FOR ELECTRONIC CONTROL UNIT

[75] Inventors: Takashi Kimura, Kanagawa-ken; Junsuke Ino, Tokyo, both of Japan

[73] Assignee: Nissan Motor Co., Ltd., Kanagawa-ken, Japan

[21] Appl. No.: 08/831,793

[22] Filed: Apr. 9, 1997

[30] Foreign Application Priority Data

Apr. 9, 1996 [JP] Japan ................................. 8-112047

[51] Int. Cl.⁷ ...................................... G06F 11/00
[52] U.S. Cl. ........................... 714/24; 714/22; 714/55; 714/734
[58] Field of Search ........................... 395/182.22, 182.2, 395/182.21, 185.08; 371/22.4, 22.5, 25.1; 714/24, 22, 23, 55, 732, 734, 735

[56] References Cited

U.S. PATENT DOCUMENTS

| | | | |
|---|---|---|---|
| 4,670,676 | 6/1987 | Nishitani | 327/143 |
| 5,113,504 | 5/1992 | Matsuda | 395/182.21 |
| 5,247,163 | 9/1993 | Ohno et al. | 235/492 |
| 5,408,648 | 4/1995 | Gokan et al. | 395/182.21 |
| 5,576,650 | 11/1996 | Hirotani et al. | 327/142 |

FOREIGN PATENT DOCUMENTS

| | | | |
|---|---|---|---|
| 54-56740 | 5/1979 | Japan | G06F 11/00 |
| 4-291634 | 10/1992 | Japan | G06F 11/30 |

Primary Examiner—Dieu-Minh T. Le
Attorney, Agent, or Firm—McDermott, Will & Emery

[57] ABSTRACT

Accompanied by turning on power, power ON reset pulse from a power ON reset generation circuit is input to CPU and a fail determining circuit. After receiving the power ON reset pulse, the fail determining circuit intentionally outputs a fail detection signal. The CPU intentionally stops output of PRUN signal after confirming that fail detection signal. WDT confirms that output of the PRUN signal from the CPU is stopped in a predetermined time interval T and outputs PRUN abnormality signal. A reset pulse generation circuit confirms that PRUN abnormality signal is supplied from the WDT and outputs a reset pulse. A fail determining circuit receives a reset pulse and stops output of fail detection signal. When the fail determining circuit stops output of the fail detection signal, the CPU determines that the WDT, the reset pulse generation circuit and the fail determining circuit are in normal state. Thus, this monitoring system for electronic control unit is capable of diagnosing the WDT, the reset pulse generation circuit and the fail determining circuit at the time of self-diagnosis.

11 Claims, 8 Drawing Sheets

MONITORING SYSTEM FOR ELECTRONIC CONTROL UNIT

BACKGROUND OF THE INVENTION

1. Field of the Invention

This invention relates to monitoring system for electronic control unit containing microcomputers.

2. Description of the Prior Art

Conventionally, for example, monitoring system for electronic control unit for vehicles as shown in FIGS. 1 and 2 has been known (see Japanese Patent Application Laid-Open Nos. 54-56740 and 4-291634 in which the same types of inventions are proposed).

FIG. 1 shows a configuration of a conventional monitoring system for electronic control unit and FIG. 2 shows a time chart of respective signals at the time when that system is operative.

A microcomputer (hereinafter referred to as CPU) 101 outputs a program run signal (hereinafter referred to as PRUN signal) having a predetermined cycle to a watch dog timer (hereinafter referred to as WDT) 2. The WDT 2 monitors that the PRUN signal is being output properly, that is, that duty ratio, frequency, pulse width and the like are proper, that is, that continuity of the PRUN signal is maintained. Referring to FIG. 2, signal A indicates an output signal of a power ON reset generation circuit 6 for initializing the CPU 101. During an operation of the system, the signal A is usually at high (H) level.

If the CPU 101 runs away, the PRUN signal changes relative to a state in which the duty ratio, frequency and the like are proper. Thus, the WDT 2 detects an abnormality in PRUN signal and outputs a PRUN abnormality signal (indicated by the signal C in FIG. 2) to a reset generation circuit 3. If the reset generation circuit 3 receives a PRUN abnormality signal from the WDT 2, it generates reset pulses having a predetermined cycle as shown by the signal D in FIG. 2. This reset pulse is input into a fail determining circuit 104 and at the same time, also input to the CPU 101 through an AND gate 7. Because the signal to the other terminal of the AND gate 7 is always at high level as described above, if reset pulse is output from the reset generation circuit 3, the CPU 101 is initialized. If the CPU 101 is initialized, the program restarts so that a normal state is gained.

If the CPU 101 is not restored to normal state even if the reset pulse is input thereto, because ot not runaway of the program but a fault of the CPU 101 itself, fail safe state must be gained to hold the system at safety side. Thus, unless the CPU 101 is restored to normal state even if reset pulse is output for example by more than three times, as shown in FIG. 2, the fail determining circuit 104 outputs a fail detecting signal to a fail safe unit 5 thereby making the system in fail safe state.

If the WDT 2 is in such a trouble that it does not output the PRUN abnormality signal, that is, if the CPU 101 stops outputting the PRUN signal but the WDT 2 does not output a PRUN abnormality signal corresponding to that stop, no reset pulse is generated from the reset generation circuit 3. Thus, the CPU 101 is in a state in which the program is running away. To avoid this state, the CPU 101 has a function for diagnosing the WDT 2 and the reset generation circuit 3. That is, the CPU 101 intentionally stops output of PRUN signal to the WDT 2 and finally it resets itself, thereby diagnosing whether the WDT 2 and the reset generation circuit 3 properly generate PRUN abnormality signal and reset pulse respectively.

Here, whether resetting of the CPU 101 occurs depending on such a diagnosis or due to an ordinary fault is determined by the CPU 101 after the resetting. Thus, the following method is applied for the CPU 101 after resetting to determine whether the resetting of the CPU 101 depends on such a diagnosis or an ordinary fault. That is, the CPU 101 writes data predetermined in particular address of a connected memory 21, for example, a flag indicating under diagnosis at the time of diagnosis and then stops output of the PRUN signal. Then, when activated again by the reset pulse, the CPU 101 reads a content of the particular address to identify whether that resetting occurred depending on a diagnosis or other reasons.

However, in the aforementioned conventional monitoring system, when a signal indicating that the CPU 101 itself is in trouble, that is, a fail detecting signal is output from the fail determining circuit 104, the fail safe unit 5 is activated. Therefore, if there occurs such a trouble that the fail determining circuit 104 outputs no fail detection signal although the CPU 101 itself is in trouble, that is, the fail determining circuit 104 itself is in trouble, the fail safe unit 5 cannot be activated, which is a problem of conventional art. On the other hand, as described above, diagnosis of the conventional monitoring system is limited to the WDT 2 and the reset generation circuit 3. There is no means for diagnosing a trouble in the fail determining circuit 104.

SUMMARY OF THE INVENTION

Therefore, an object of the present invention is to provide monitoring system for electronic control unit having an improved reliability and capable of diagnosing a fail determining circuit as well as a watch dog timer and a reset generation circuit, to solve the aforementioned conventional problem.

According to the present invention, there is provided a monitoring system for an electronic control unit comprising: a power ON reset generation means for generating a power ON reset pulse accompanied by turning on power; a control means for determining that a monitoring means, a reset pulse generation means and the fail determining means are normally operative when it confirms that a fail determining means is outputting a fail detection signal after receiving the power ON reset pulse and that the fail determining means stops output of the fail detection signal after intentionally stopping output of PRUN signal for indicating that the control means is operating normally; the monitoring means for outputting PRUN abnormality signals if it confirms that the output of the PRUN signal from the control means is stopped in a first predetermined time interval; the reset pulse generation means f or outputting reset pulses when it confirms that the PRUN abnormality signal is output from the monitoring means; and the fail determining means for outputting the fail detection signal when the power ON reset pulse is input and stopping output of the fail detection signal when said reset pulse is input.

According to the present invention, accompanied by turning on power, power ON reset pulse from a power ON reset generation means is input to a control means and a fail determining circuit. After receiving the power ON reset pulse, the fail determining circuit intentionally outputs a fail detection signal. The CPU intentionally stops output of PRUN signal after confirming that fail detection signal. A monitoring means confirms that output of the PRUN signal from the control means is stopped in a first predetermined time interval T and outputs PRUN abnormality signal. A reset pulse generation means confirms that PRUN abnormality signal is supplied from the monitoring means and outputs a reset pulse. A fail determining means receives a reset pulse and stops output of fail detection signal. When the fail determining circuit stops output of the fail detection signal, the control means determines that the monitoring means, the reset pulse generation means and the fail determining means are in normal state. Thus, this monitoring system for electronic control unit is capable of diagnosing the monitoring means, the reset pulse generation means and the fail determining means at the time of self-diagnosis conducted when power is turned on.

According to another preferred embodiment of the present invention, there is provided a monitoring system for electronic control unit wherein the control means determines that the fail determining means is in trouble when the fail determining means does not stop output of the fail detection signal within a second predetermined time interval after intentionally stopping output of the PRUN signal.

According to still another preferred embodiments of the present invention, there is provided a monitoring system for electronic control unit wherein the control means is so constructed to receive the reset pulse output from the reset pulse generation means.

According to this structure, the control means is capable of determining whether or not the monitoring means or the reset pulse generation means is in normal condition.

According to a further preferred embodiment of the present invention, there is provided a monitoring system for electronic control unit wherein the control means determines that the monitoring means or the reset pulse generation means is in trouble it the reset pulse is not input within a second predetermined time interval after intentionally stopping the output of the PRUN signal.

According to a still further preferred embodiment of the present invention, there is provided a monitoring system for electronic control unit wherein the fail determining means is so constructed to receive the PRUN abnormality signal output from the monitoring means.

According to a yet still further preferred embodiment of the present invention, there is provided a monitoring system for electronic control unit wherein the fail determining means comprises: a flip-flop of output stage in which the power ON reset pulse is input to a reset terminal; an AND gate for inputting the PRUN abnormality signal to one input terminal thereof and for inputting output signal of the output stage flip-flop to the other input terminal thereof; and a plurality of flip-flops connected in series in which the reset pulse is input to respective clock input terminals and output signal of final stage is input to an input terminal of the flip-flop of output stage, the output signal of the flip-flop of output stage being output in form of the fail detection signal.

According to the above described structure, the fail determining means outputs a fail detection signal by inputting the power ON reset pulse and stops output of the fail detection signal by inputting a single reset pulse. At the time of ordinary detection of abnormality, after the reset pulse is input by the same number as the flip-flop, the fail determining means outputs the fail detection signal. Further, the respective flip-flop is so constructed not to be reset after the fail detection signal is output.

The nature, principle and utility of the invention will become more apparent from the following detailed description when read in conjunction with the accompanying drawings.

DESCRIPTION OF THE PREFERRED EMBODIMENTS

Hereinafter, embodiment of the present invention will be described in detail with reference to the accompanying drawings.

Figure 1:
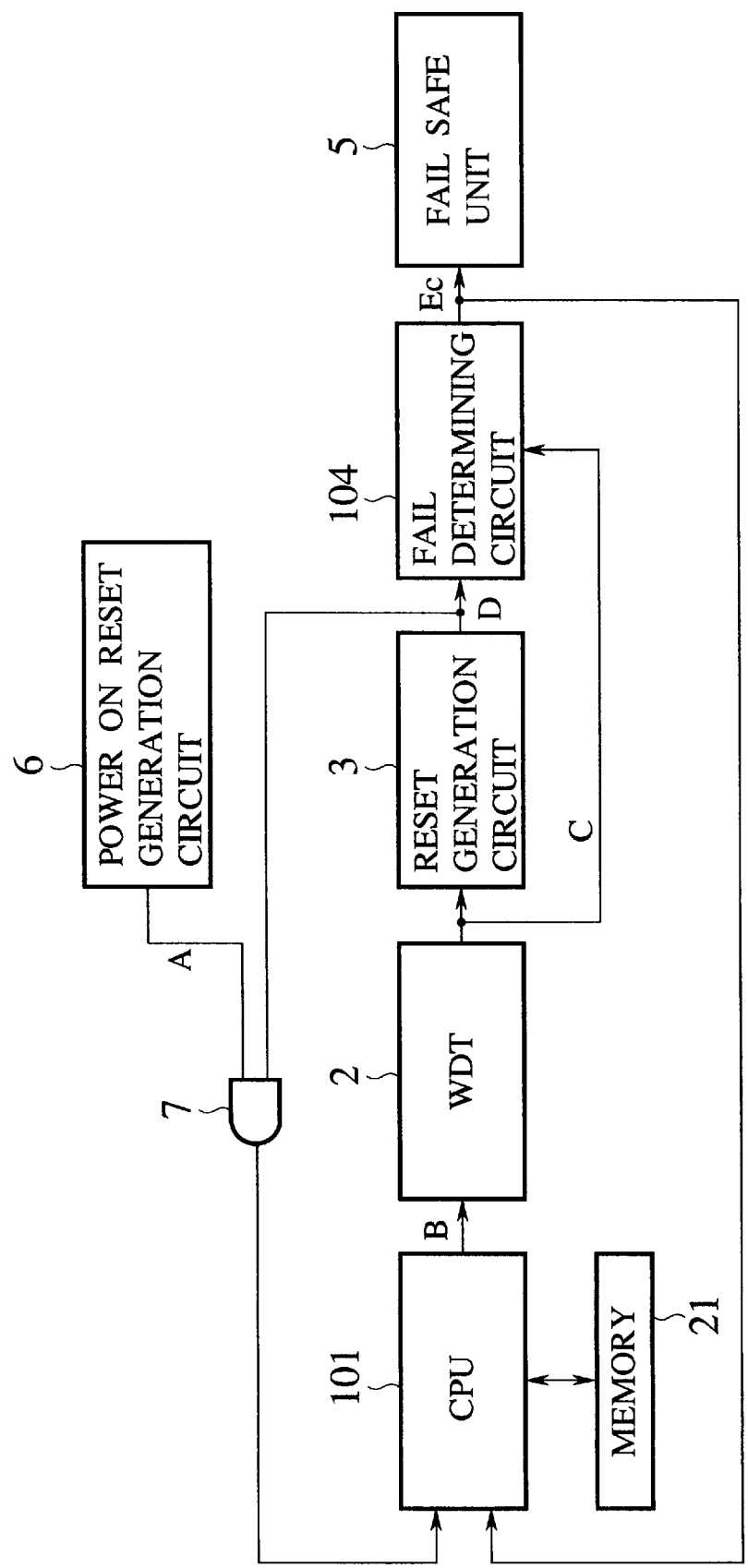
FIG. 1 is a block diagram showing a structure of a conventional monitoring system for electronic control unit.
Figure 2:
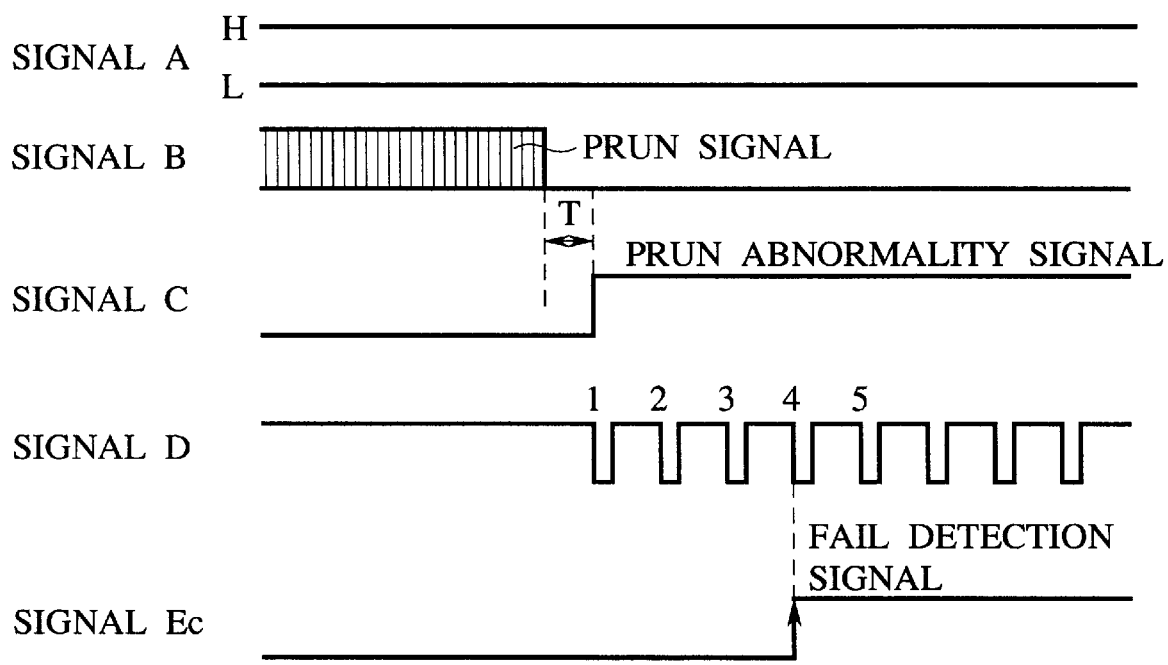
FIG. 2 is a time chart of respective signals at the time when conventional monitoring system for electronic control unit is operative.
Figure 3:
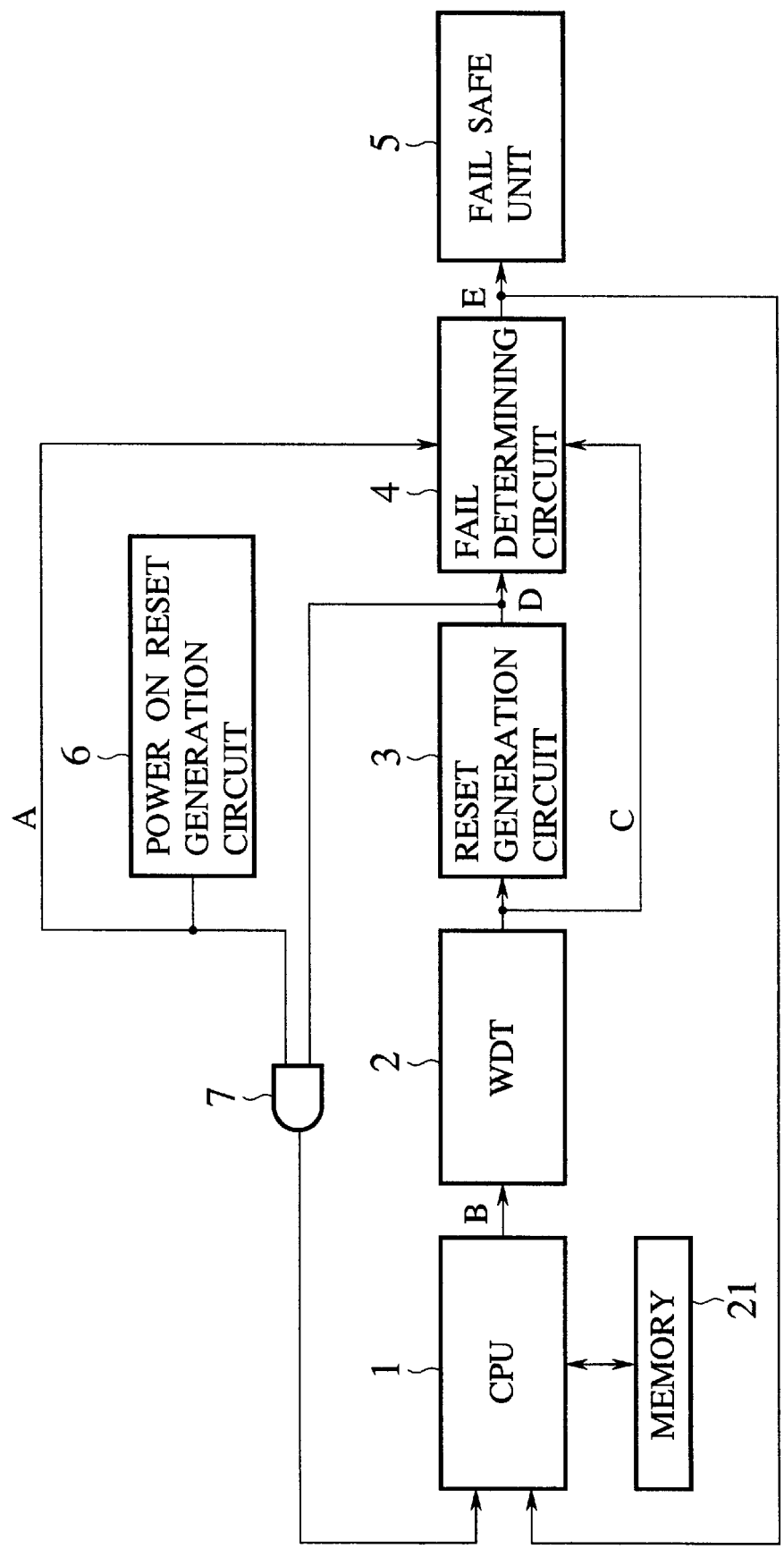
FIG. 3 is a functional block diagram showing a structure of an embodiment of monitoring system for electronic control unit according to the present invention.

FIG. 3 is a functional block diagram showing a construction of an embodiment of monitoring system for electronic control unit according to the present invention. CPU 101 outputs PRUN signals having a constant cycle to WDT 2 and the WDT 2 monitors that the PRUN signal is output normally, that is, that duty ratio, frequency, pulse width and the like are normal, that is, that continuity of the PRUN signal is maintained. If a program in the CPU 1 runs away, the WDT 2 detects that output of the PRUN signal is stopped. Then, as a signal for indicating that the program in the CPU 1 is abnormal, PRUN signal abnormality signal is output to a reset generation circuit 3 and a fail determining circuit 4.

The reset generation circuit 3 generates reset pulses having a constant cycle. This reset pulse is input to the fail determining circuit 4 and at the same time, to the CPU 1 through an AND gate 7.

Then, the CPU 1 is initialized by the reset pulse so that it is restored to normal state. Then, the program is restarted.

On the other hand, if the CPU 1 is not initialized by the reset pulse, the reset generation circuit 3 continues to output the reset signals. Thus, if a predetermined number of the reset pulses, for example more than three times of the reset pulses are input, the fail determining circuit 4 determines that it is not a run-away of the program but it is a fault in the CPU 1 itself or the CPU 1 is in fail state. Then, the fail determining circuit 4 outputs a CPU fail detection signal to a fail safe unit 5. Receiving the CPU fail safe detection signal, the fail safe unit 5 makes the system in fail safe state. Then, the system is maintained at safety side.

Output of a power ON reset generation circuit 6 is input to the CPU 1 through the AND gate and at the same time, to the fail determining circuit 4. Further, output of the fail determining circuit 4 is input to the CPU 1 as well as the fail safe unit 5.

If the fail determining circuit 4 receives a power ON reset pulse from the power ON reset generation circuit 6 in its normal state, it outputs a fail detection signal indicating a fail state. Just after the power ON reset occurs, the fail determining circuit 4 stops output of the fail detection signal by reset pulses (first reset pulse) received from the reset generation circuit 3 according to initial diagnosis on the CPU 1 so as to indicate that the system is in normal state. That is, if voltage level in which the fail detection signal is valid is high (H), conversely low (L) voltage level signal is output.

The CPU 1 determines that accompanied by the power ON reset, the fail determining circuit 4 outputs a fail detection signal and at the same time, temporarily stops PRUN signal to activate the WDT2 and the reset generation circuit 3. After that, the CPU 1 determines that the fail determining circuit 4 has stopped the fail detection signal by the reset pulse output by operation of the reset generation circuit 3 so as to determine that the WDT2. the reset generation circuit 3 and the fail determining circuit 4 are operative normally.

Meanwhile, the fail safe unit 5 is fixed to a method in which system load is not operative when system fail occurs.

Figure 4:
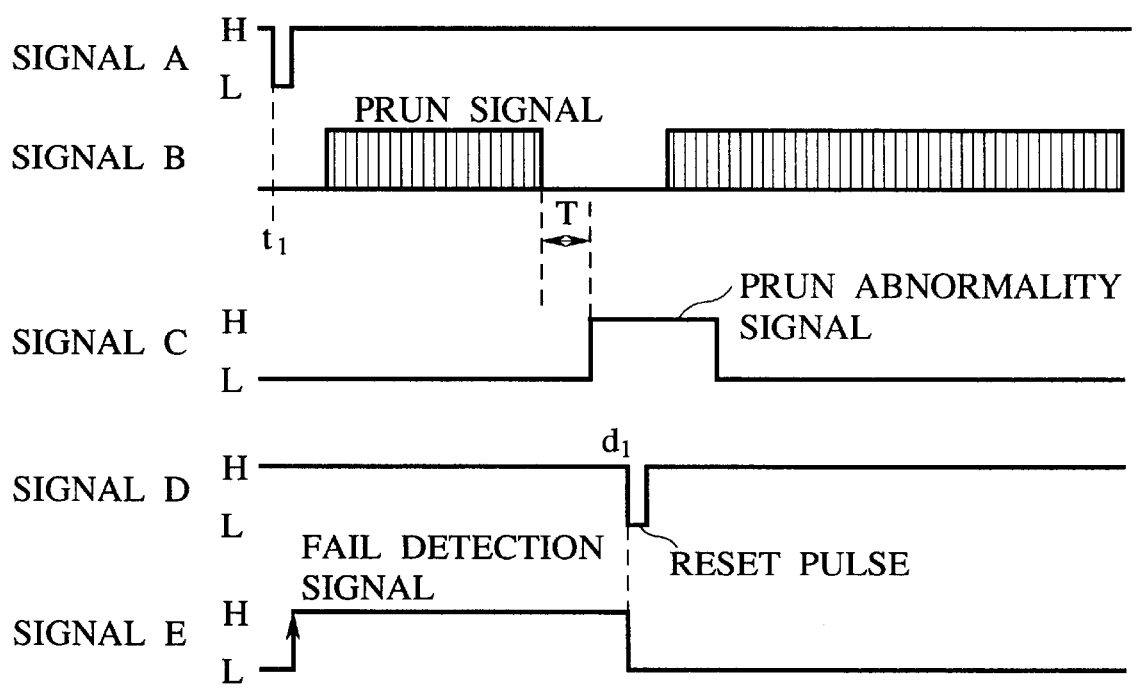
FIG. 4 is a diagram showing a timing of the operation of initial diagnosis.
Figure 5:
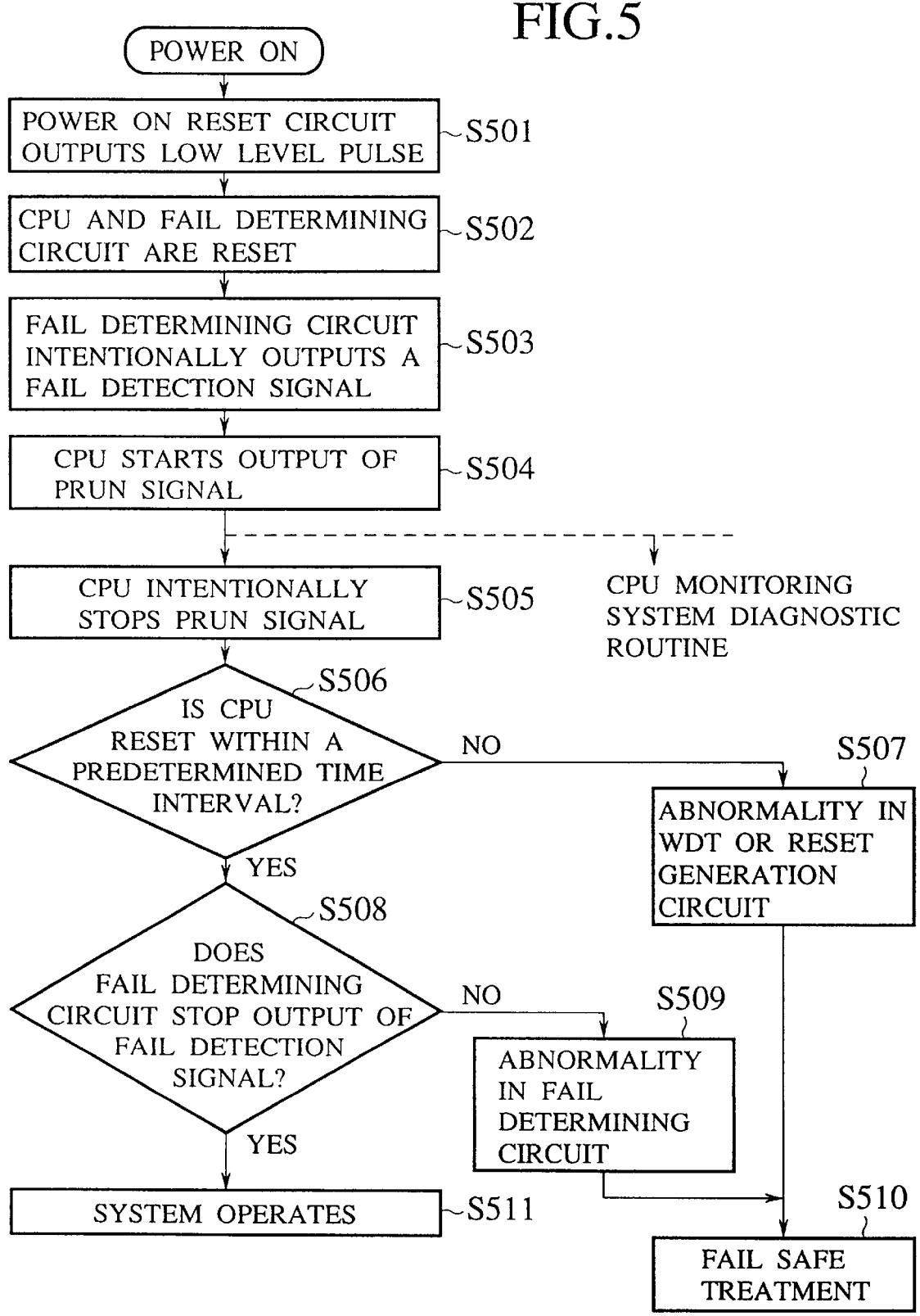
FIG. 5 is a flow chart showing steps of the operations of the monitoring system for electronic control unit according to the present invention.

FIG. 4 shows a tinting of initial diagnostic operation. Referring to the same Figure, the signal A designates an output signal of the power ON reset generation circuit 6. The signal B designates an output signal of the CPU 1. The signal C designates an output signal of the WDT 2. The signal D designates an output signal of the reset generation circuit 3. The signal E designates an output signal of the fail determining circuit 4. FIG. 5 is a flow chart showing steps of the operation of the CPU 1. The steps of the operation of the CPU 1 will be described with reference to FIGS. 4 and 5.

If system power is turned ON at time t1, the power ON reset generation circuit 6 outputs active low power ON reset pulse as shown by the signal A (step 501). This power ON reset pulse resets the CPU 1 and the fail determining circuit 4 (step 502). The fail determining circuit 4 set its output signal at high (H) level. That is, the fail detection signal is intentionally output (step 503). Accompanied by start of processing after reset, the CPU 1 temporarily starts output of the PRUN signal (step 504). After that, the CPU 1 conducts CPU monitoring system diagnostic routine. At this time, the CPU 1 sets a flag indicating that the CPU monitoring system diagnostic routine is being conducted at a memory 21. In the CPU monitoring system diagnostic routine, the CPU 1 detects that the fail determining circuit 4 is outputting a fail detection signal and intentionally stops output of the PRUN signal (step 505).

If the WDT 2 detects that the PRUN signal is down beyond the detecting time T as shown in FIG. 4, in its normal condition, it outputs the PRUN abnormality signal to the reset generation circuit 3 and the fail determination circuit 4. If the reset generation circuit 3 receives the PRUN abnormality signal, in its normal condition, it outputs a first reset pulse d1 just after power ON reset. If the CPU 1 receives the reset pulse d1, it is reset again. Further, if the fail determination circuit 4 receives the reset pulse d1, in its normal condition, it stops output of the fail detection signal.

Thus, the CPU 1 determines whether or not the it was reset within a predetermined time interval (step 506). Unless it was reset within a predetermined time interval, the CPU 1 determines that the WDT 2 or the reset generation circuit 3 is in trouble (step 507). On the other hand, if it was reset within a predetermined time interval, the CPU 1 determines whether the fail determining circuit 4 has stopped output of the fail detection signal (step 508). Unless the fail determining circuit 4 has stopped output of the fail detection signal, the CPU 1 determines that the fail determining circuit is in trouble (step 509). If the WDT 2, the reset generation circuit 3 or the fail determining circuit 4 is in trouble, fail safe treatment is conducted (step 510). On the other hand, if there is no trouble, the CPU 1 resets the flag indicating that the CPU monitoring system diagnostic routine is being processed in the memory 21 and activates the system (step 511).

Figure 6:
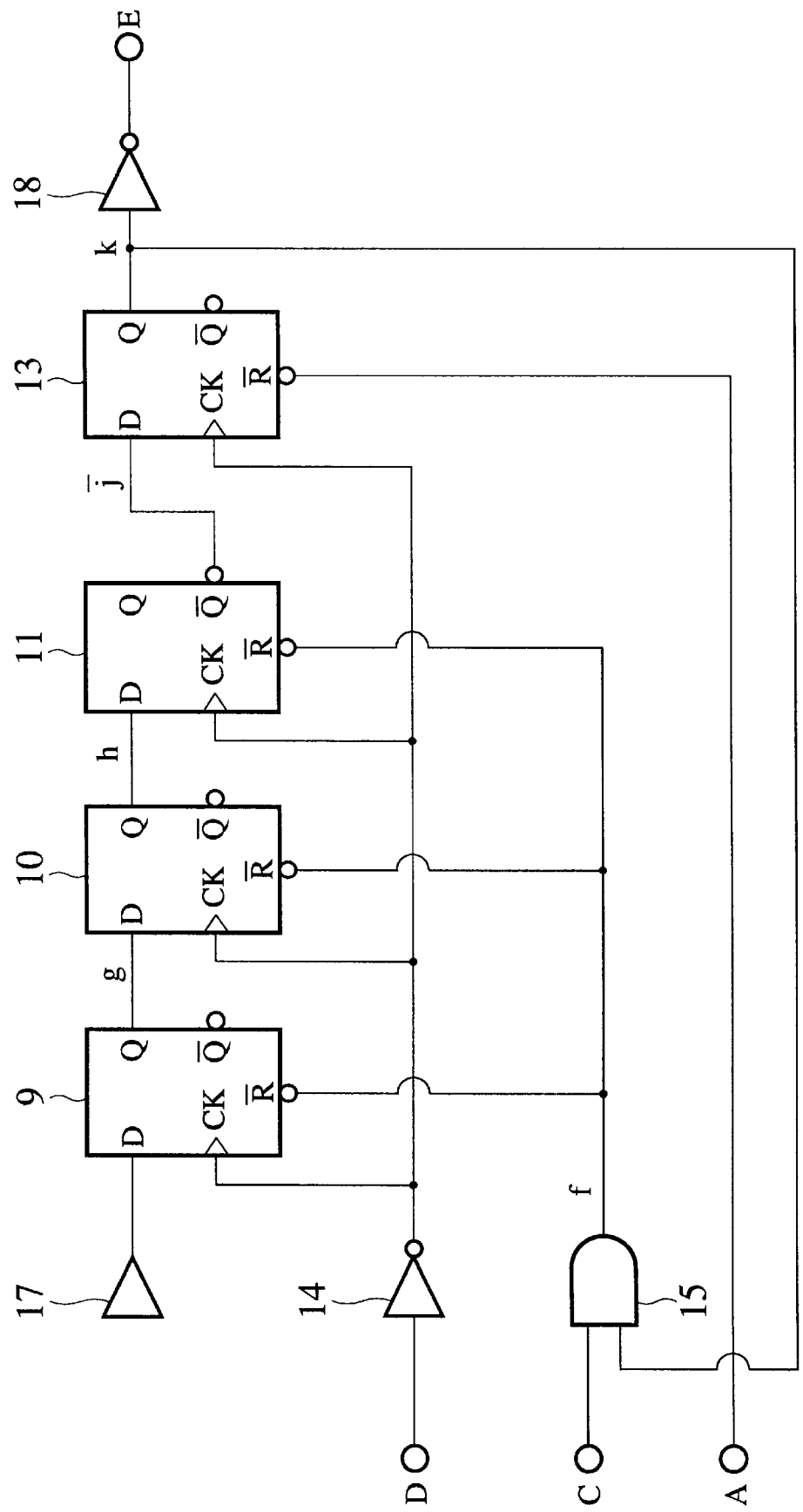
FIG. 6 is a circuit diagram showing an example of the fail determining circuit.
Figure 7:
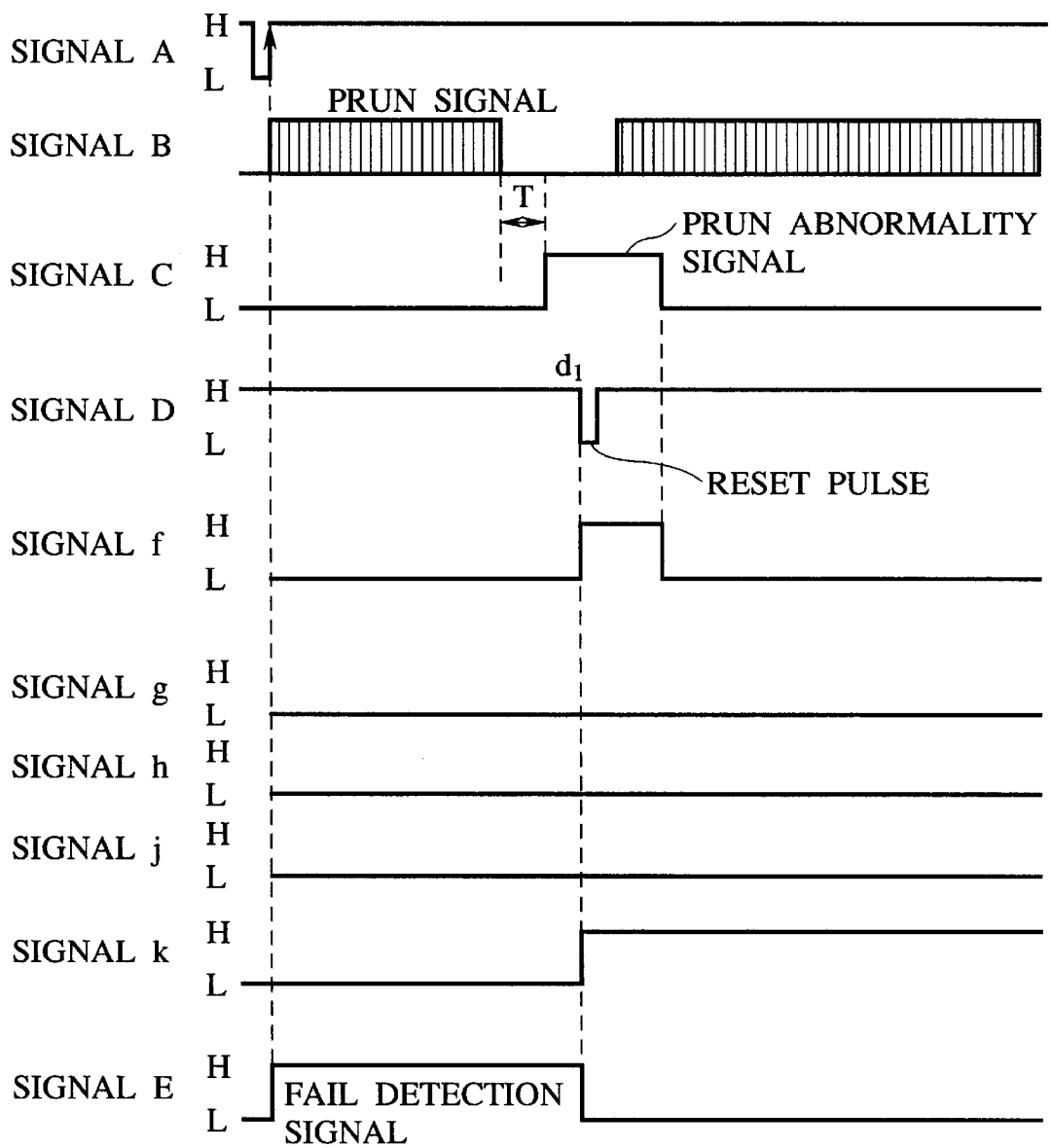
FIG. 7 is a diagram showing a timing of the operation of initial diagnosis including details of the fail determining circuit.

FIG. 6 is a circuit diagram showing an example of the fail determining circuit 4.

The fail determining circuit 4 comprises first, second, third and fourth D flip-flop (hereinafter referred to as DFF) 9, 10, 11, 13, an inverter 14 for receiving a reset pulse from the reset generation circuit 3, an AND gate 15 for receiving the PRUN abnormality signal from the WDT 2, an inverter 18 for inverting an output of the fourth DFF 13 and an element 17 for always inputting a high level to a input terminal D of the first DFF 9.

The fourth DFF 13 is a resister for storing a result of fail determination and if a power ON reset pulse output from the power ON reset generation circuit 6 when the power is turned ON is input to a reset terminal, a low level signal is output from an output terminal Q. This output is inverted by the inverter 18. Thus, the output of the inverter 18 or the output E of the fail determining circuit 4 becomes a high level. Signals from the output terminal Q of the fourth DFF is also input to the AND gate 15.

The output of the AND gate 15 is constructed to be input to the reset terminals of the first, second and third DFF 9, 10, 11. The first, second and third DFF 9, 10, 11 form a resistor for counting the reset pulse. The output signal D of the reset generation circuit 3 is input to each clock input terminal of the first, second, third and fourth DFF 9, 10, 11, 13.

The initial diagnostic operation of the fail determining circuit 4 will be described with reference to an operation timing diagram of FIG. 6. Referring to the same Figure, the signal A indicates an output signal of the power ON reset generation circuit 6, the signal B indicates an output signal of the CPU 1, the signal C indicates an output signal of the WDT 2, the signal D indicates an output signal of the reset generating circuit 3, the signal E indicates an output signal of the fail determining circuit 4, the signal f indicates an output signal of the AND gate, and the signals g, h, j, k indicate signals of the output terminals Q of the first, second, third and fourth DEF 9, 10, 11, 13.

First, when the power is turned on, the power ON reset generation circuit 6 outputs power ON reset pulse. This power ON reset pulse is input to a reset terminal of the fourth DFF 13 of the fail determining circuit 4. If the power ON reset pulse is input to the reset terminal of the fourth DFF, the output terminal Q of the fourth DFF becomes a low level. Thus, a signal inverted by the inverter 18 or output signal E of the fail determining circuit 4 becomes a high level. That is, the fail determining circuit 4 outputs a fail signal.

The low level output signal of the fourth DFF 13 is input to respective reset terminals of the first, second and third DFF 9, 10, 11 through the AND gate 15 so that the first, the second and the third DFF 9, 10, 11 are reset.

On the other hand, as described above, the power ON reset pulse of the power ON reset circuit 6 is input to the CPU 1 through the AND gate 15 so that the CPU 1 is reset. The CPU 1 detects that the fail determining circuit 4 outputs the fail detection signal and then intentionally stops output of they PRUN signal.

In the normal state, if the WDT 2 detects that the PRUN signal is stopped beyond the detection time T, it outputs the PRUN abnormality signal to the reset generation circuit 3 and the fail determining circuit 4. In the normal condition, if the reset generation circuit 3 receives the PRUN abnormality signal, it outputs a first reset pulse d1 just after power 10 ON reset. This first reset pulse d1 is input to the CPU 1 through the AND gate 7 and then input to the fail determining circuit 4.

The first reset pulse d1 input to the fail determining circuit 4 is inverted by the inverter 14 and input to respective clock input terminals of the first, second, third and fourth DFF 9, 10, 11, 13 as active high pulse.

At this time, as described previously, the third DFF 11 has been reset and output signal from the output terminal /Q is high level. Thus, an input terminal D of the fourth DFF 13 is supplied with high level signals. Thus, the signal from the output terminal Q of the fourth DFF 13 is inverted to high level by the first reset pulse d1. This high level signal is inverted by the inverter 18. Thus, the output signal E of the fail determining circuit 4 becomes low level so that the output of the fail detection signal is stopped.

Because a signal from the output terminal Q of the fourth DFF 13 is input to the AND gate 15 also, while this signal is high level, the output signal C of the WDT 2 or the PRUN abnormality signal can be supplied to respective reset terminals of the first, second and third DFF 9, 10, 11.

As described above, the CPU 1 detects that the fail determining circuit 4 outputs the fail detection signal at the time of initialization after power ON reset. Further, the CPU 1 detects that the fail determining circuit 4 stops an output of the fail detection signal by the first reset pulse d1 output by the reset generation circuit 3. The CPU 1 confirms that the fail determining circuit 4 has stopped output of the fail detection signal and then diagnoses that the fail determining circuit 4 is normally operative.

Figure 8:
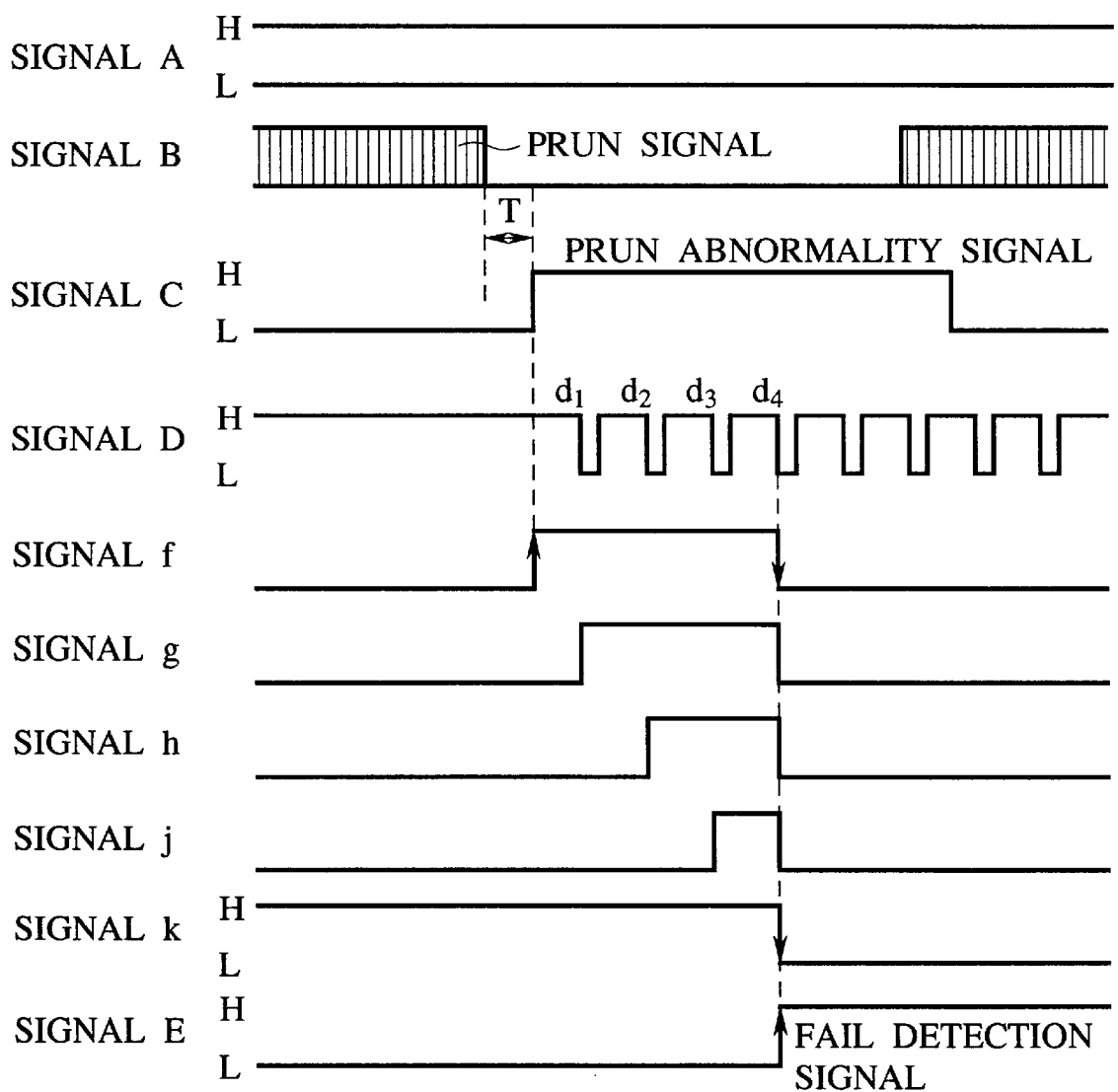
FIG. 8 is a diagram showing a timing of the operation at the time of ordinary trouble time.

Next, referring to an operation timing chart shown in FIG. 8, an action which occurs if any abnormality occurs during operation will be described.

If the WDT 2 detects that the PRUN signal has been stopped or has been in cycle abnormality condition(stopped in a case of FIG. 8) beyond the detecting time T after the PRUN signal is stopped or the PRUN signal becomes in cycle abnormality condition, it outputs PRUN abnormality signal to the reset generation circuit 3 and the fail determining circuit 4.

If receiving the PRUN abnormality signal, the fail determining circuit 4 is operated as follows. If the PRUN abnormality signal is input to the AND gate 15, the output signal f of the AND gate 15 is inverted from low level to high level because high level signal output from the fourth DFF 13 is output to the other input terminal of the AND gate 15. Thus, high level signal is input to respective reset terminals of the first, second and third DFF 9, 10, 11. Thus, the first, second and third DFF 9, 10, 11 are reset. After that, the reset pulse from the reset generation circuit 3 is input to respective clock terminals of the first, second and third DFF 9, 10, 11.

An element 17 for outputting high level is connected to an input terminal D of the first DFF 9 such that high level signal is always input thereto. Thus, high level is shifted one by one. Namely, at the time of trailing of a first reset pulse d1, an output signal g of the first DFF9 is inverted from low level to high level. At the time of trailing of a second reset pulse d2, an output signal b of the second DFF 10 is inverted from low level to high level. At the time of trailing of a third reset pulse d3, an output signal j of the third DFF 11 is inverted from low level to high level.

An input terminal D of the fourth DFF 13 is supplied with an inverted signal of the output signal j of the third DFF 11. Thus, at the time of trailing of the fourth reset pulse d4, an output signal k of the fourth DFF 13 is inverted from high level to low level. The output signal k of the fourth DFF 13 is inverted by the inverter 18. Thus, the output of the inverter 18 is inverted from low level to high level. That is, the fail detection signal is output. The fail safe unit 5 of a next stage is activated by this fail detection signal.

In this embodiment, it the reset pulse is output three times, it is determined that a fault occurs, so that the system is made into fail safe condition.

Further, because the output signal k of the fourth DFF is low level, an output signal f of the AND gate becomes low level, so that the first, second and third DFF 9, 10, 11 are reset. Thus, successive PRUN abnormality signals are rejected and the output signal k of the fourth DFF 13 is maintained until next power ON. Thus, the fail safe unit 5 maintains the fail safe condition.

As described above, according to this embodiment, it is possible to diagnose the fail determining circuit 4 at the time of initial diagnosis in addition to conventional diagnosis of the WDT 2 and the reset generation circuit 4.

Further, because the fail determining circuit 4 has such a structure, the fail detection signal is output by inputting the power ON reset pulse and the output of the fail detection signal is stopped by inputting a single reset pulse. Further, at the time of ordinary detection of abnormality, after the reset pulse is input by the same number as that of flip-flop, the fail determining circuit 4 outputs the fail detection signal. Further, the respective flip-flop is constructed not to be reset after the fail detection signal is output.

It should be understood that many modifications and adaptations of the invention will become apparent to those skilled in the art and it is intended to encompass such obvious modifications and changes in the scope of the claims appended hereto.

What is claimed is:

1. A monitoring system for an electronic control unit of a machine or controlled object comprising:

control means for carrying out a predetermined operation and outputting a program run (PRUN) signal having a predetermined cycle when the operation is carried out in a predetermined normal fashion;

monitoring means for outputting a PRUN abnormality signal upon confirming that said PRUN signal is stopped for a predetermined time;

reset pulse generation means responding to said PRUN abnormality signal by outputting a reset pulse for resetting said control means upon confirming that said PRUN abnormality signal is input thereto;

fail determining means responding to said reset pulse by outputting a fail detection signal for making a controlled object carry out a fail safe function thereof upon confirming that said reset pulse is input thereto more than a predetermined number of times; and power ON reset generation means for outputting a power ON reset signal for resetting said control means when a power supply voltage at a predetermined value is provided to said control means; wherein said fail determining means outputs said fail detection signal upon confirming that said power ON reset signal is input thereto and stops output of said fail detection signal upon confirming that said reset pulse is input thereto;

said control means confirms that said fail determining means is outputting said fail detection signal after receiving said power ON reset signal and stops output of said PRUN signal; and said control means determines that said fail determining means is operating normally upon confirming that said fail determining means stops output of said fail detection signal after said control means halts output of said PRUN signal.

2. The monitoring system according to claim 1, wherein said control means further determines that said monitoring means and said reset pulse generation means are operating normally upon confirming that said fail determining means stops output of said fail detection signal after said control means halts output of said PRUN signal.

3. The monitoring system according to claim 1, wherein said fail determining means outputs the fail detection signal in response to a single pulse of the power ON reset signal.

4. The monitoring system according to claim 1, wherein said fail determining means stops outputting the fail detection signal in response to a first pulse of the reset pulse after the power ON reset signal is input thereto.

5. A monitoring system for an electronic control unit comprising:

power ON reset generation means for generating a power ON reset pulse when power is turned on;

fail determining means connected to receive said power ON reset pulse for generating a fail detection signal when said power ON reset pulse is input thereto;

control means for determining that a monitoring means, a reset pulse generation means and said fail determining means are normally operative by confirming that said fail determining means is outputting said fail detection signal after receiving said power ON reset pulse, by stopping output of a program run (PRUN) signal and by confirming that said fail determining means stops output of said fail detection signal after said control means stops output of said PRUN signal;

said monitoring means operating for outputting a PRUN abnormality signal upon confirming that output of said PRUN signal from said control means is stopped for a first predetermined time interval;

said reset pulse generation means operating for outputting a reset pulse signal upon confirming that said PRUN abnormality signal is output from said monitoring means; and said fail determining means operating for stopping output of said fail detection signal when said reset pulse signal is input thereto from said reset pulse generation means.

6. A monitoring system for an electronic control unit according to claim 5, wherein said control means determines that said fail determining means has failed by confirming that said fail determining means does not stop output of said fail detection signal within a second predetermined time interval after said control means stops output of said PRUN signal.

7. A monitoring system for an electronic control unit according to claim 5, wherein said control means is constructed to receive said reset pulse signal output from said reset pulse generation means.

8. A monitoring system for an electronic control unit according to claim 7, wherein said control means determines that at least one of said monitoring means and said reset pulse generation means has failed by confirming that said reset pulse signal is not input within a second predetermined time interval after said control means stops output of said PRUN signal.

9. A monitoring system for an electronic control unit according to claim 5, wherein said fail determining means is constructed to receive said PRUN abnormality signal output from said monitoring means.

10. A monitoring system for an electronic control unit according to claim 9, wherein said fail determining means comprises:

a plurality of series-connected flip-flops and an output stage flip-flop connected thereto;

said output stage flip-flop having a reset terminal, said power ON reset pulse input to said reset terminal;

an AND gate having said PRUN abnormality signal input to one input terminal thereof and having an output signal of said output stage flip-flop input to another input terminal thereof; and wherein said reset pulse signal is input to respective clock input terminals of said flip-flops and an output signal of a final stage of said series-connected of flip-flops is input to an input terminal of said output stage flip-flop, the output signal of said output stage flip-flop being output in a form of said fail detection signal.

11. A method of monitoring a microprocessor based control system of a machine, the method comprising:

supplying voltage at a predetermined level to the microprocessor;

performing, responsive thereto, an initializing process of the microprocessor and outputting program run (PRUN) signals at a predetermined frequency as long as the initializing process is being conducted properly;

outputting a PRUN abnormality signal upon confirming that output of said PRUN signal is stopped for a first predetermined time interval;

outputting a reset pulse responsive to the PRUN abnormality signal for causing a fail detection device to output a fail detection signal if the PRUN abnormality signals have been output more than a predetermined number of times;

performing a fail-safe operation on the machine to be controlled upon occurrence of said fail detection signal, wherein the method further includes:

activating the output of the fail detection device so as to both apply a surrogate, fail detection signal to the microprocessor in response to the voltage supply and to reset said surrogate signal responsive to receipt of the PRUN abnormality signal supplied thereafter;

stopping, in response to the surrogate signal, the output of the PRUN signal from the microprocessor while continuing the initializing process thereto;

indicating a malfunction of the system unless said microprocessor confirms that said surrogate signal from the fail detection device is reset after said microprocessor stops output of said PRUN signal.

\* \* \* \* \*